Patented Jan. 10, 1950

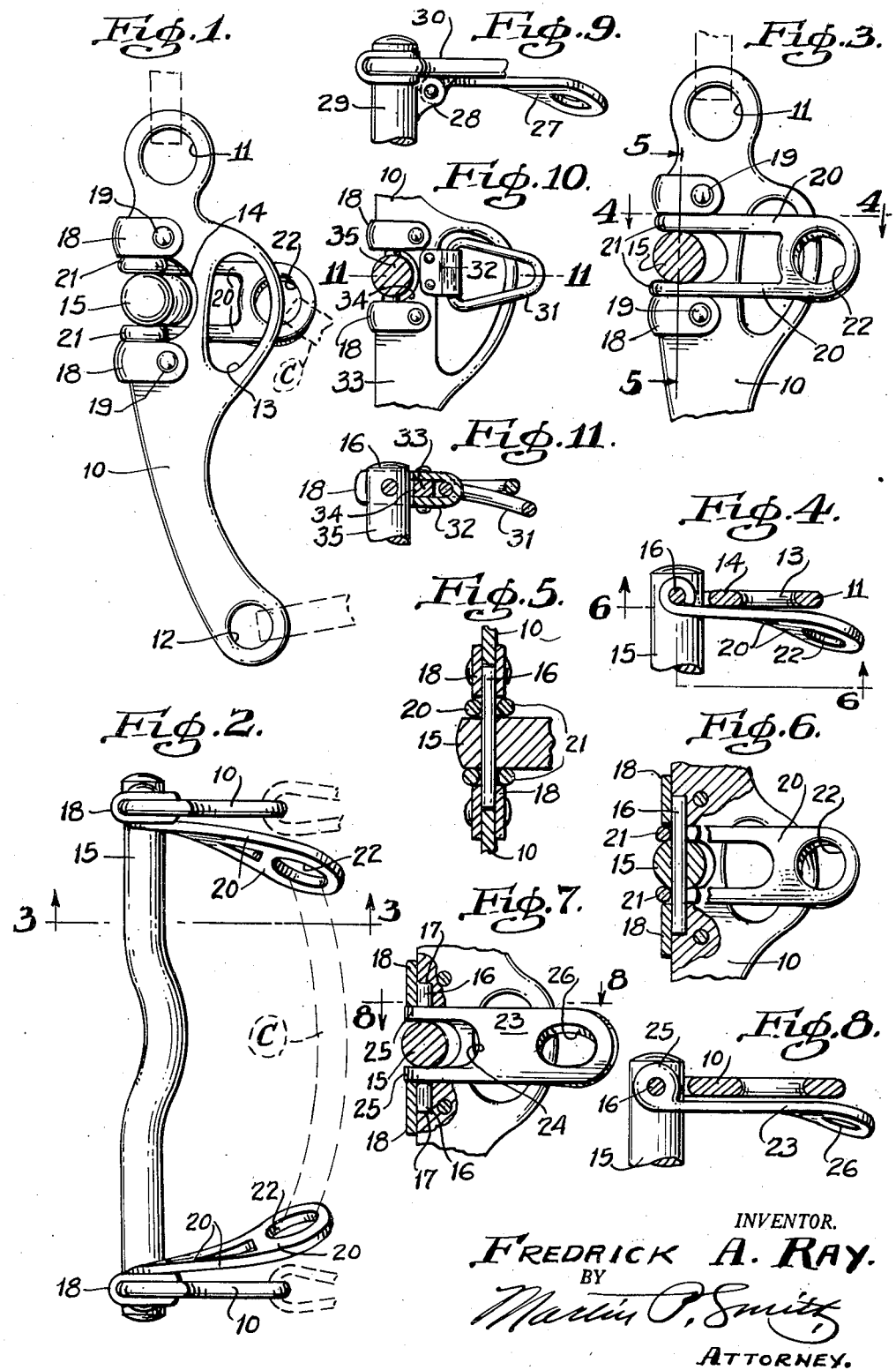

2,494,201

UNITED STATES PATENT OFFICE 2,494,201

CURB BIT

Fredrick A. Ray, Reseda, Calif.

Application May 20, 1947, Serial No. 749,134

6 Claims. (Cl. 54—7)

1

My invention relates to a curb bit adaptable for use on a riding or driving bridle, and has for its principal object, to provide simple, effective means, pivotally mounted on the mouthpiece and shanks or cheek pieces of the bit, for holding the curb in the desired location beneath the horse's jaw, so that at all times, the bit is maintained in proper position for use without the possibility of ejection of the mouthpiece from the mouth as a result of upward throw of the animal's head or, by pressures exerted by the tongue.

Further objects of my invention are to provide an improved construction in curb bits for maintaining the curb in fairly snug, but not too tight position against the underside of the animal's jaw so that when the mouthpiece is rotated by pull on the reins, said curb and its supporting arms will simultaneously apply pressure to both sides and underside of the jaw so as to more effectively control the animal and further, to provide a construction which will not at any time, pinch the animals' lips at the sides of the jaws.

A further object of my invention is to provide a bit which, in service will bring about better control and a quicker response of the animal, with light pull on the reins.

With the foregoing and other objects in view, my invention consists in certain novel features of construction and arrangement of parts which will be hereinafter more fully described and claimed and illustrated in the accompanying drawing, in which:

Fig. 1 is a side elevational view of my improved bit.

Fig. 2 is a plan view.

Fig. 3 is a vertical section taken on the line 3—3 of Fig. 2.

Fig. 4 is a horizontal section taken on the line 4—4 of Fig. 3.

Fig. 5 is a vertical section taken on the line 5—5 of Fig. 3.

Fig. 6 is a vertical cross section taken on the line 6—6 of Fig. 4.

Fig. 7 is a vertical section similar to Fig. 6 and showing a modified form of the curb suspension arms.

Fig. 8 is a horizontal section taken on the line 8—8 of Fig. 7.

Fig. 9 is a detail plan view showing a modified arrangement for the mouting of the curb suspension arms.

Fig. 10 is a sectional view similar to Fig. 3, and showing a modified form of the curb supporting arm.

Fig. 11 is a horizontal section taken on the line 11—11 of Fig. 10.

Referring by numerals to the accompanying drawing which illustrates a preferred embodiment of my invention, 10, 10, designates the shanks or cheek pieces of the bit, each provided

2 in its upper end with an aperture 11 for the cheek straps of the bridle and in its lower end with an aperture 12, for the bridle reins. When the bit is applied to a driving horse, the reins may be attached to eyes 13 formed in the rear intermediate portions of said cheek pieces.

Formed in the front portions of cheek pieces 10 in front of the eyes 13, are notches 14 open at the front, for reception of the ends of a mouthpiece 15 of conventional or special shape. Pivot pins 16 pass vertically through the ends of mouthpiece 15 with the ends of said pins journalled in bearings 17 formed in shanks 10 above and below notches 14, and covering the sides of said bearings are horizontally disposed U-shaped members 18 secured to said shanks by screws or rivets 19.

The curb carrying arms may be formed of wire as shown in Figs. 1 to 6 inclusive, or from short metal straps, as seen in Figs. 7 and 8, and when formed of wire, each arm comprises upper and lower members 20, the ends of which are formed into eyes 21, which are positioned above and below the ends of mouthpiece 15 and receive the pivot pins 16. Thus, the curb carrying arms lie immediately adjacent the inner faces of shanks 10, with each arm twisted and curved slightly intermediate its ends, so that the lower ones of members 20 are disposed further away from shanks 10 than the upper ones of said members, and both upper and lower members of said arms curve gradually toward each other away from the shanks as best seen in Figs. 2 and 4. An eye or loop 21 is formed in the free end of each arm for reception of the curb C.

In Figs. 7 and 8, the curb carrying arms 23 are in the form of short metal strips, twisted slightly intermediate their ends, and curved lengthwise so as to project inwardly away from the shanks, and the inner end of each arm is provided with a notch 24 for the reception of the end of the mouthpiece, and with eyes 25 which receive pivot pins 16.

The free end of each arm is provided with a curb receiving aperture 26.

In Fig. 9, the curb carrying arm 27 is pivotally connected to a lug 28 formed on mouthpiece 29, just inside shank or cheek piece 30. In the modification shown in Figs. 10 and 11, the curb carrying arm 31, in the form of a loop, is hinged by means of a clip 32 to the cheek piece 33 just behind the notch 34 which receives the end of mouthpiece 35.

It is to be noted that in all forms of my improved bit, the curb suspension arms are in the same plane with the mouthpiece, and thus when said mouthpiece is partially rotated by pull on the reins connected to the lower ends of shanks 10, said arms and curb will be swung upward to simultaneously exert pressure on both sides and underside of the animal's jaw, thus giving practically perfect control of the animal wearing the bit.

Thus it will be seen that I have provided a curb bit that is simple in structure, inexpensive of manufacture and very effective in performing the functions for which it is intended.

Minor changes in the size, form and construction of the various parts of my improved curb bit may be made and substituted for those herein shown and described without departing from the spirit of the invention, the scope of which is set forth in the appended claims.

I claim as my invention:

1. In a curb bit, the combination with a mouthpiece and shanks pivotally connected thereto which shanks are provided in their front edges with notches, of curb suspension arms pivotally associated with said mouthpiece and shanks and with the ends of said mouthpiece and arms disposed within the notches in said shanks.

2. In a curb bit, as set forth in claim 1, which arms extend from the end portions of the mouthpiece rearwardly adjacent the inner faces of said shanks in horizontal alignment with said mouthpiece.

3. In a curb bit, the combination as set forth in claim 1 and the free end portions of which arms curve inwardly away from said shanks.

4. In a curb bit, the combination with a mouthpiece, of shanks pivotally connected to the ends of said mouthpiece, and curb carrying arms pivotally connected to said mouthpiece and extending rearwardly therefrom adjacent the inner faces of said shanks.

5. In a curb bit, the combination as set forth in claim 4 and the free end portions of which arms curve inwardly away from said shanks.

6. In a curb bit, a pair of shanks provided in their forward edges with notches, vertically disposed pins having their ends seated in said shanks above and below said openings, a mouthpiece having its ends pivotally mounted on said pins and horizontally disposed curb suspension arms pivotally connected to said pins and extending rearwardly therefrom, inside said shanks.

FREDRICK A. RAY.

REFERENCES CITED

The following references are of record in the file of this patent:

UNITED STATES PATENTS

| Number | Name | Date |
|---|---|---|
| 422,900 | Allen | Mar. 11, 1890 |
| 823,368 | Schlueter | June 12, 1906 |
| 992,961 | Harvey | May 23, 1911 |